H. T. PRATT.

Life-Preserving Stools.

No. 5,425. Reissued May 27, 1873.

Witnesses
W. L. Benneu.
Louis Seaman

Inventor
Henry T. Pratt
by his attorney
C. L. Kenrick

AM. PHOTO-LITHOGRAPHIC CO. N.Y. (OSBORNE'S PROCESS.)

UNITED STATES PATENT OFFICE.

HENRY T. PRATT, OF NEW YORK, N. Y.

IMPROVEMENT IN LIFE-PRESERVING STOOLS.

Specification forming part of Letters Patent No. 100,801, dated March 15, 1870; reissue No. 5,425, dated May 27, 1873; application filed September 17, 1872.

*To all whom it may concern:*

Be it known that I, H. T. PRATT, of the city, county, and State of New York, have made an invention of a new and Improved Life-Preserver Stool; and I do hereby declare that the following is a clear, full, and exact description thereof, which will enable others skilled in the art to make and use the same, reference being had to the accompanying drawings forming part of this specification.

Life-preserver stools made previous to my invention, so far as my knowledge extends, may be divided into two classes. In one of these classes the requisite buoyancy has been obtained by combining one or more air-vessels of tin plate, or of wood in thin laminæ, with the other parts of the stool. In the other class the buoyancy has been obtained by padding or plating the frame-work of the stool with cork. Life-preserver stools of the air-vessel class are much superior in buoyancy to the latter class; but are objectionable because air-vessels of tin plate are subject to rust, particularly when exposed to salt-air, as they are when used on steamers on the seaboard; and because wood, when in thin laminæ, is liable to split and crack when exposed to extremes of heat and moisture. Wood in thin laminæ is also easily indented and cracked by a blow; hence life-preserver stools with wooden air-vessels can not be relied on for continued use.

The object of my invention is to render life-preserver stools of the air-vessel class as permanently valuable as those which are rendered buoyant by means of cork; and to this end my invention consists, mainly of a life-preserver stool constructed with a light, tough, incorrodible air-vessel, so that the stool, while having all the advantages incident to the air-vessel construction, is not liable to be rendered useless by rust or corrosion, or to crack from changes of temperature or moisture, or by a blow. My invention consists further of certain new combinations of the parts of the stool, which are specified particularly at the close of this schedule.

In order that my invention may be understood, I have represented in the accompanying drawing, and will proceed to describe, a stool embodying it in the best form known to me at the date of my application for the original patent.

Figure 1:
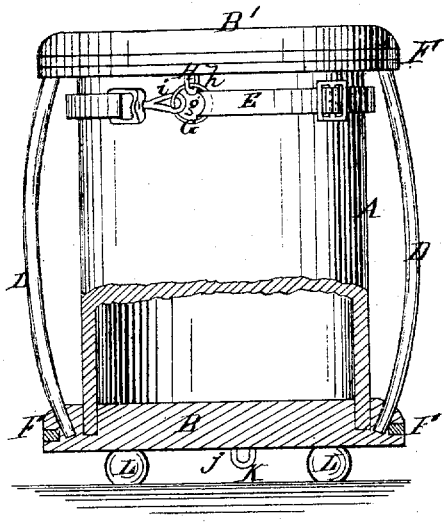
Figure 2:
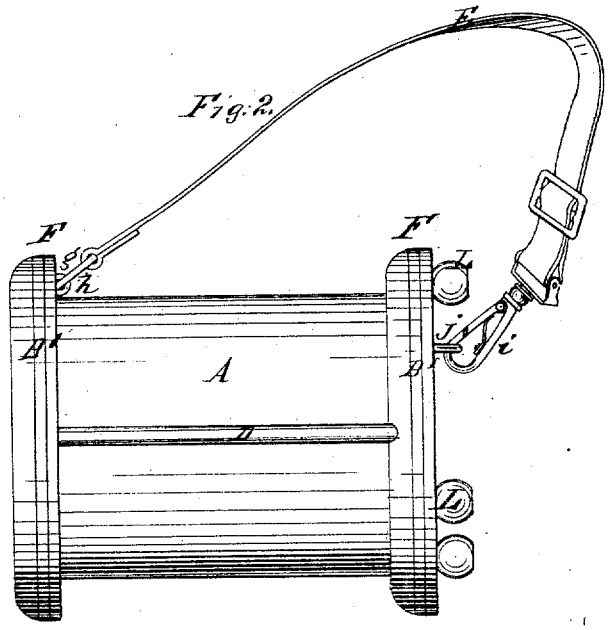

Figure 1 in said drawing represents an elevation of the said life-preserver stool, partly in section, and in the position for use as a stool. Fig. 2 represents a side elevation of the same when used for a float or life-preserver.

The same parts in the two figures are indicated by the same letters of reference.

The said stool is composed mainly of the hollow cylinder A, the base B, and the head B′. It is fitted with two handles, D, and with a strap, E. The cylinder A which forms the wall of the air-chamber is composed of paper—straw-paper or Manila paper being preferred—and the cylinder being formed by rolling the sheets of paper in succession upon a former, the faces of the sheets being coated with glue or other cement. As paper material has a close firm texture, and is tough, strong, and light, the wall made of it is impervious to air and water; is not liable to split or crack by exposure to extremes of heat and moisture or from a blow; and, in addition, it is not corrodible by any of the agencies to which life-preserving stools are subjected. Hence the employment of this material imparts to the wall of the air-vessel of the stool the valuable properties of light weight, tenacity or toughness, resistance to corrosive agents, and to the action of heat, which have not heretofore been simultaneously combined in air-vessel life-preserver stools.

In order to protect the surface of the cylinder from the continued action of water, I have coated it with paint. The base B and the seat B′ are made of wood, and each has an annular groove turned in it, into which the open end of the paper cylinder A is fitted and secured by glue or other cement, so that the joint is air-tight, and the use of nails or screws is rendered unnecessary. The base and seat thus constitute heads for the cylinder, or wall of the air-chamber, in addition to performing their functions as base and seat for the stool; and when so fitted then greatly strengthen the cylinder and increase its capacity to resist injury by blows, or by external pressure.

Grooves are made in the peripheries of the seat and base, and are packed with strong paper bands in order to strengthen them and prevent warping. These bands also hold the ends of the handles, which, in this instance, are engaged in holes near the peripheries of the seat and base. The handles extend beyond the peripheries of the base and seat, and therefore prevent the stool from rolling on the deck when lying on its sides.

The strap E or a cord may be connected with the stool in any suitable way at one end—say, by the rings *g* and staples *h*, and the other end may have a snap-hook, *i*, to engage with the ring *j*, when the stool is used for a seat; but when used as a buoy the strap, after being passed around the body under the arms, may be connected to the staples at the end opposite the one where the ring *g* is connected. One of the heads which forms the base may have short legs or knobs to rest upon, if preferred.

I do not, however, limit myself to the precise arrangement herein shown for connecting the cylinder and the ends, nor to the mode of connecting the handles or straps; nor do I limit myself to the cylindrical form of the air-chambers; as all these details may be varied without departing substantially from my invention.

I claim as my invention—

1. A life-preserver stool having an air-chamber with a tough incorrodible wall of paper material, substantially as before set forth, the same being a new article of manufacture.

2. The combination of the life-preserver stool with the handles, projecting beyond the peripheries of the seat and base, substantially as before set forth.

3. The combination of the wooden heads of the life-preserver stool with paper bands for strengthening the same, substantially as before set forth.

HENRY T. PRATT.

Witnesses:
W. L. BENNEM,
LOUIS SEAMAN.